US011196223B2

(12) United States Patent
Lee et al.

(10) Patent No.: US 11,196,223 B2
(45) Date of Patent: Dec. 7, 2021

(54) CONNECTOR

(71) Applicants:HYUNDAI MOTOR COMPANY, Seoul (KR); KIA MOTORS CORPORATION, Seoul (KR); Tyco Electronics AMP Korea Co., Ltd., Gyeongsan-si (KR)

(72) Inventors: Cheol Hun Lee, Suwon-si (KR); Kun Teak Lim, Gyeongsan-si (KR); Chang Ho Lee, Gyeongsan-si (KR)

(73) Assignees: HYUNDAI MOTOR COMPANY, Seoul (KR); KIA MOTORS CORPORATION, Seoul (KR); Tyco Electronics AMP Korea Co., Ltd., Gyeongsan-si (KR)

( * ) Notice: Subject to any disclaimer, the term of this patent is extended or adjusted under 35 U.S.C. 154(b) by 0 days.

(21) Appl. No.: 16/851,469

(22) Filed: Apr. 17, 2020

(65) Prior Publication Data

US 2021/0175673 A1    Jun. 10, 2021

(30) Foreign Application Priority Data

Dec. 4, 2019    (KR) .......................... 10-2019-0160196

(51) Int. Cl.
*H01R 31/02*    (2006.01)
*H01R 24/58*    (2011.01)
*B60R 1/12*    (2006.01)
*H01R 107/00*    (2006.01)

(52) U.S. Cl.
CPC ............ *H01R 31/02* (2013.01); *H01R 24/58* (2013.01); *B60R 1/12* (2013.01); *B60R 2001/1223* (2013.01); *H01R 2107/00* (2013.01); *H01R 2201/26* (2013.01)

(58) Field of Classification Search
CPC .... H01R 31/02; H01R 24/58; H01R 2107/00; H01R 2201/26
USPC .......................................................... 439/638
See application file for complete search history.

(56) References Cited

U.S. PATENT DOCUMENTS

| | | | |
|---|---|---|---|
| 8,025,538 B2 * | 9/2011 | Hara ........................ | H01R 4/64 439/723 |
| 8,100,730 B2 * | 1/2012 | Hara ...................... | H01R 11/12 439/721 |
| D710,806 S  * | 8/2014 | Tsukamoto .................. | D13/147 |
| 9,083,094 B2 * | 7/2015 | Teramoto ................. | H01R 4/64 |
| 9,083,107 B2 * | 7/2015 | Suzuki ............... | H01R 13/5202 |
| 9,211,852 B2 * | 12/2015 | Omori ...................... | H01R 4/64 |
| 9,318,827 B2 * | 4/2016 | Osada .................... | H01R 13/15 |
| 9,362,665 B2 * | 6/2016 | Omori ............... | H01R 13/4223 |
| 9,667,017 B2 * | 5/2017 | Suzuki ................... | H01R 11/09 |

(Continued)

*Primary Examiner* — Alexander Gilman
(74) *Attorney, Agent, or Firm* — Lempia Summerfield Katz LLC

(57) ABSTRACT

A connector includes a connector housing including: a plurality of insertion holes; a plurality of connection terminals inserted into some of the plurality of insertion holes and configured to be electrically connected to a first set of a plurality of tab terminals of a sensor unit; and a joint terminal accommodated inside the connector housing. The joint terminal includes at least one grounding terminal part electrically connected to at least one of a second set of the plurality of tab terminals and a joint connection part electrically connected to a ground connection terminal, which is one of the plurality of connection terminals.

9 Claims, 20 Drawing Sheets

(56) References Cited

U.S. PATENT DOCUMENTS 9,876,289 B2 * 1/2018 Endo ................... H01R 13/055
9,922,755 B2 * 3/2018 Matsui ............... H01R 13/4361

* cited by examiner

CONNECTOR

CROSS-REFERENCE TO RELATED APPLICATION

This application claims the benefit of priority to Korean Patent Application No. 10-2019-0160196, filed in the Korean Intellectual Property Office on Dec. 4, 2019, the entire contents of which are incorporated herein by reference.

TECHNICAL FIELD

The present disclosure relates to a connector.

BACKGROUND

In general, a rearview mirror at an interior of a vehicle or a side mirror on a side of the vehicle is used to determine a rear state of the vehicle. There is a limit in checking the rear state using the rearview mirror. The rearview mirror is difficult to secure a clear rear side view. The side mirror has a blind spot on the side of the vehicle.

Various devices are used for overcoming the above limitations of checking the rear view when reversing and securing the clear rear view. Warning sound to a driver when an obstacle is detected is generated using a sensor at the rear of the vehicle. The obstacle may also be captured and displayed for the driver to see the obstacle using a rear camera mounted on the rear of the vehicle. Thus, rear monitoring is performed.

When the sensors of the same type are installed in various positions as described above, it is necessary to distinguish a signal transmitted from each sensor at each position to a single computing device depending on the position.

SUMMARY

The present disclosure has been made to solve the above-mentioned problems occurring in the prior art while advantages achieved by the prior art are maintained intact.

An aspect of the present disclosure provides a connector, which is capable of recognizing a position of a sensor unit in a simplified configuration.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a connector includes a connector housing including a plurality of insertion holes. The connector further includes a plurality of connection terminals inserted into some of the plurality of insertion holes and configured to be electrically connected to some, i.e., a first set, of a plurality of tab terminals of a sensor unit. The connector further includes a joint terminal accommodated inside the connector housing. The joint terminal includes at least one grounding terminal part electrically connected to at least one of the others, i.e., a second set, of the plurality of tab terminals. The joint terminal further includes a joint connection part electrically connected to a ground connection terminal, which is one of the plurality of connection terminals.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
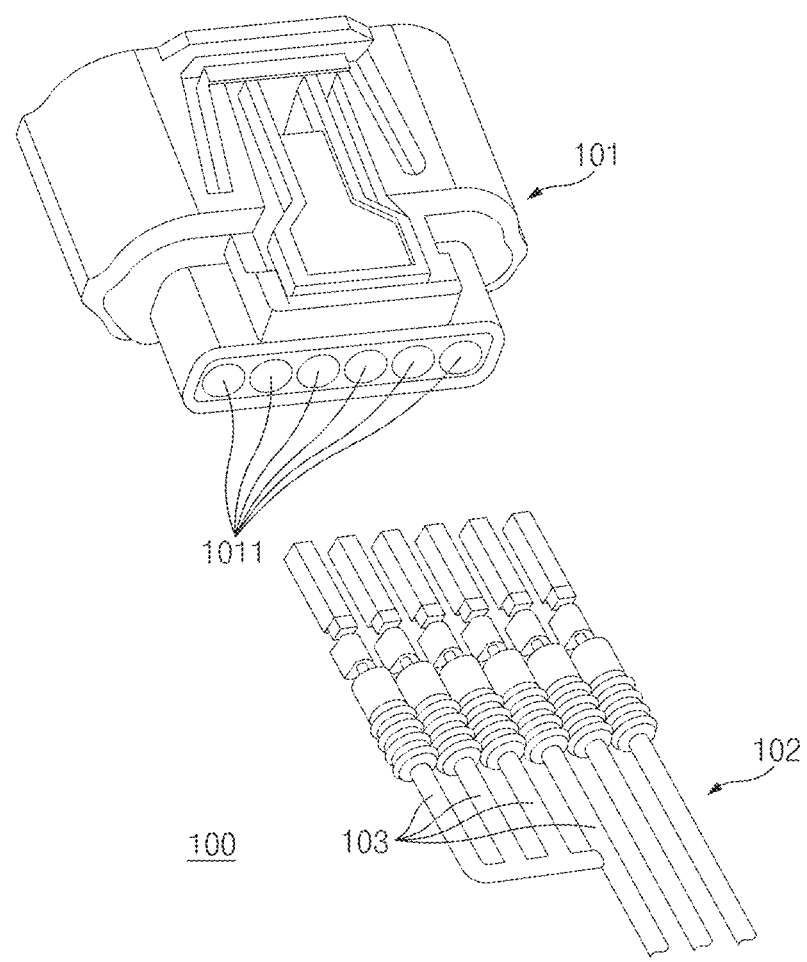
FIG. 1 is an exploded perspective view of a connector.

Hereinafter, some embodiments of the present disclosure are described in detail through drawings. In adding reference numerals to components of each drawing, it should be noted that the same reference numerals are assigned to the same components as much as possible even though they are shown in different drawings. In addition, in describing the embodiments of the present disclosure, when it is determined that the detailed description of the related well-known configuration or function interferes with the understanding of the embodiments of the present disclosure, the detailed description thereof has been be omitted.

In addition, in describing the components of the embodiments of the present disclosure, terms such as first, second, A, B, (a), and (b) may be used. These terms are only for distinguishing the components from other components. The nature or order of the components is not limited by the terms. When a component is described as being "connected", "coupled," or "accessed" to another component, one component may be directly connected or accessed to the other component. However, it should be understood that another component may be "connected", "coupled" or "accessed" between the components.

FIG. 1 is an exploded perspective view of an connector 100.

Insertion holes 1011, through which connection terminals 102 are capable of passing, may be formed in a connector housing 101 of the connector 100. The number of insertion holes 1011 may correspond to the number of connection terminals 102. The connection terminals 102 may be inserted into the connector housing 101 and configured to be connected to tab terminals of a sensor unit. Connection terminals 103 of the connection terminals 102 may be connected to the tab terminals used for grounding among the tab terminals and may be connected to one another to form one wire at the rear end thereof, i.e., distal from the connection terminals 103. Thus, the tab terminals used for grounding may be grounded.

However, because the type and number of the tab terminals to be grounded are changed depending on a position where the sensor unit is disposed, the number and arrangement of the connection terminals 103 which is grounded among the connection terminals 102 of the connector 100 coupled to each sensor unit should be different. Therefore, the wire to be combined at the rear end depends on each position. Thus, a process of preparing the connector 100 in each position may be complicated and difficult.

Figure 2:
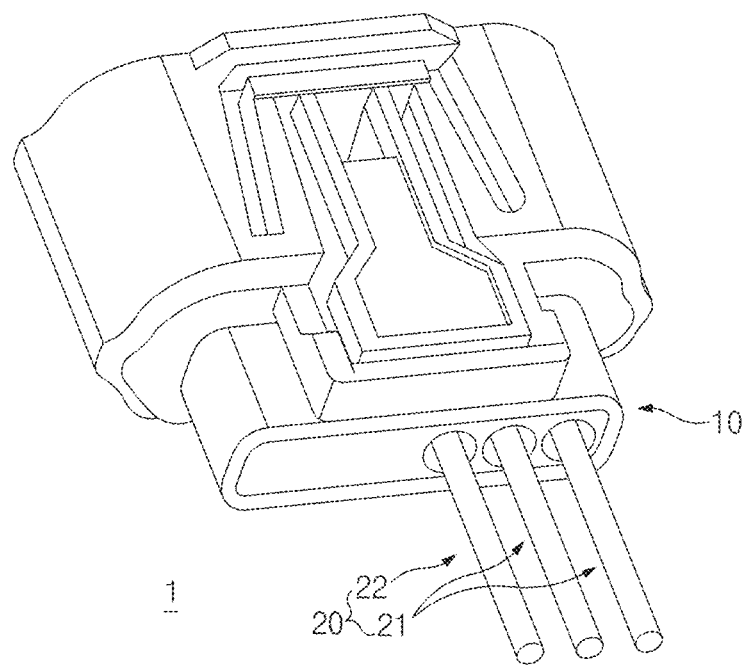
FIG. 2 is a perspective view of a connector according to an embodiment of the present disclosure.
Figure 3:
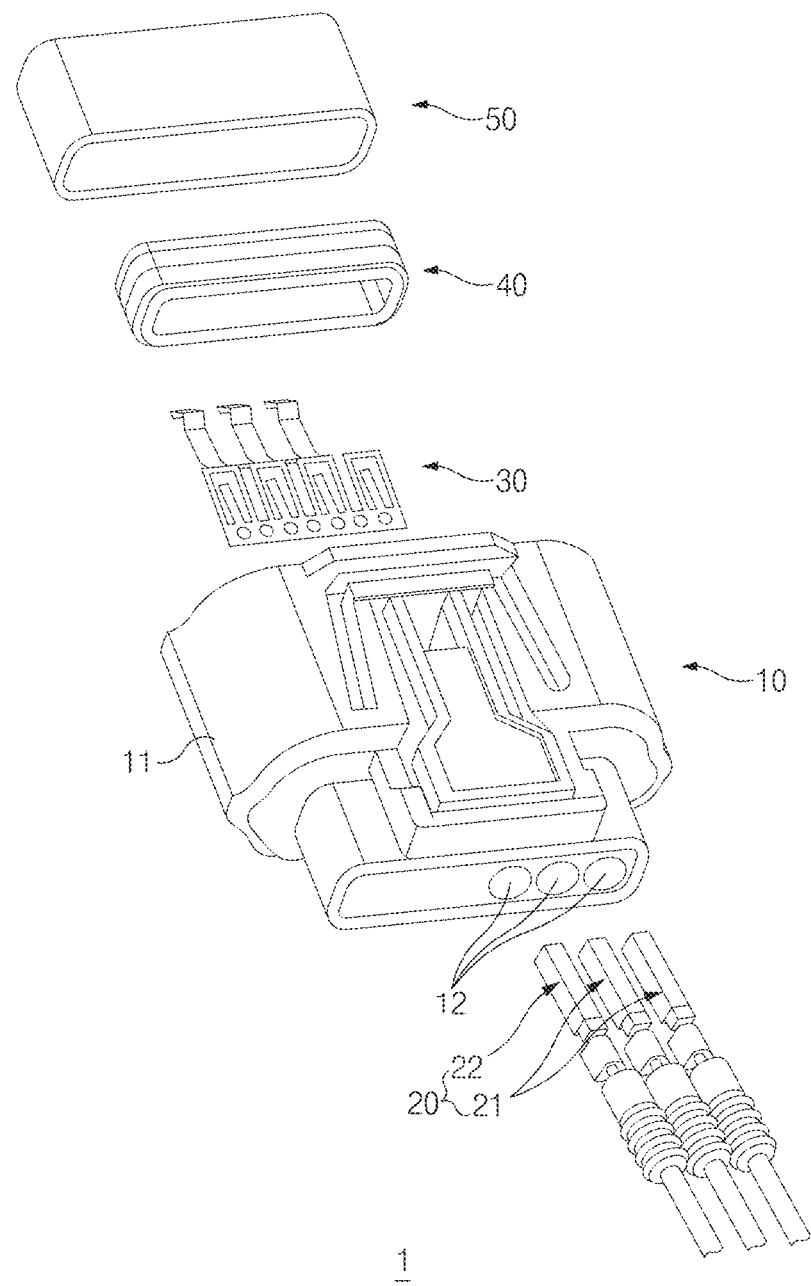
FIG. 3 is an exploded perspective view of a connector according to an embodiment of the present disclosure.
Figure 4:
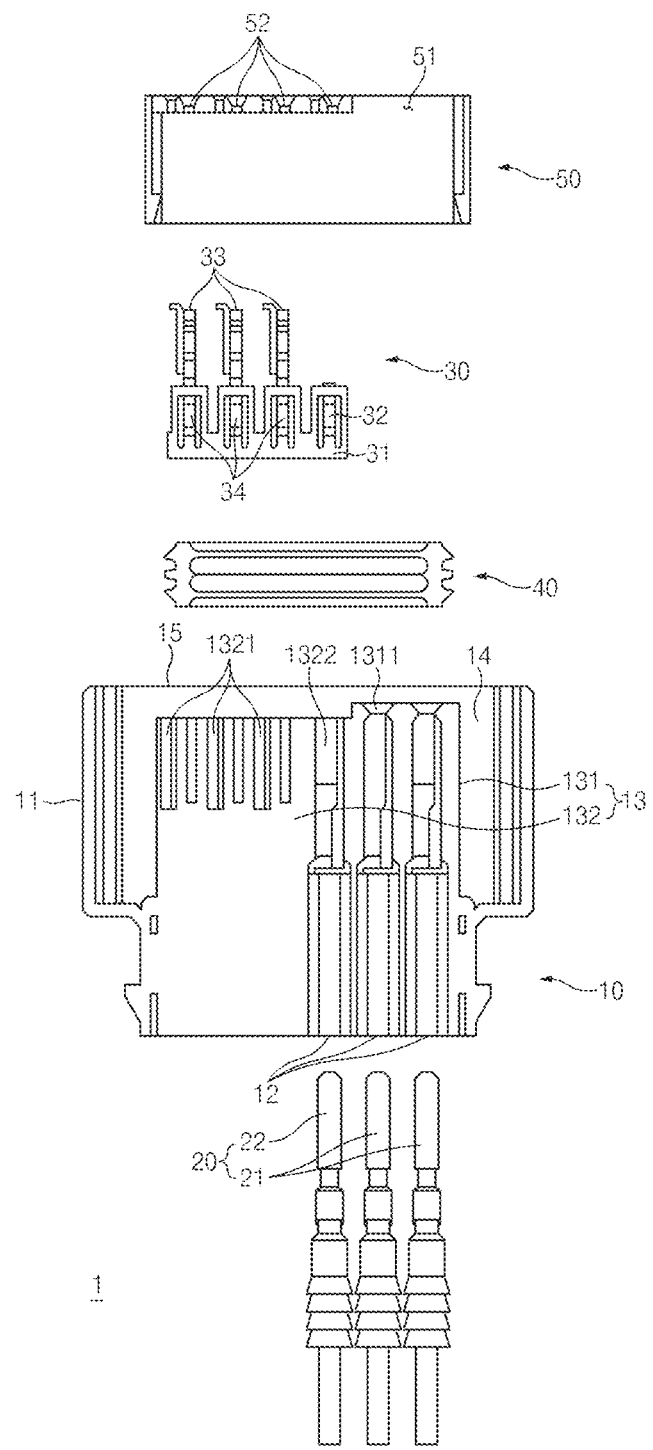
FIG. 4 is a cross-sectional view illustrating a connector in an exploded state according to an embodiment of the present disclosure.
Figure 5:
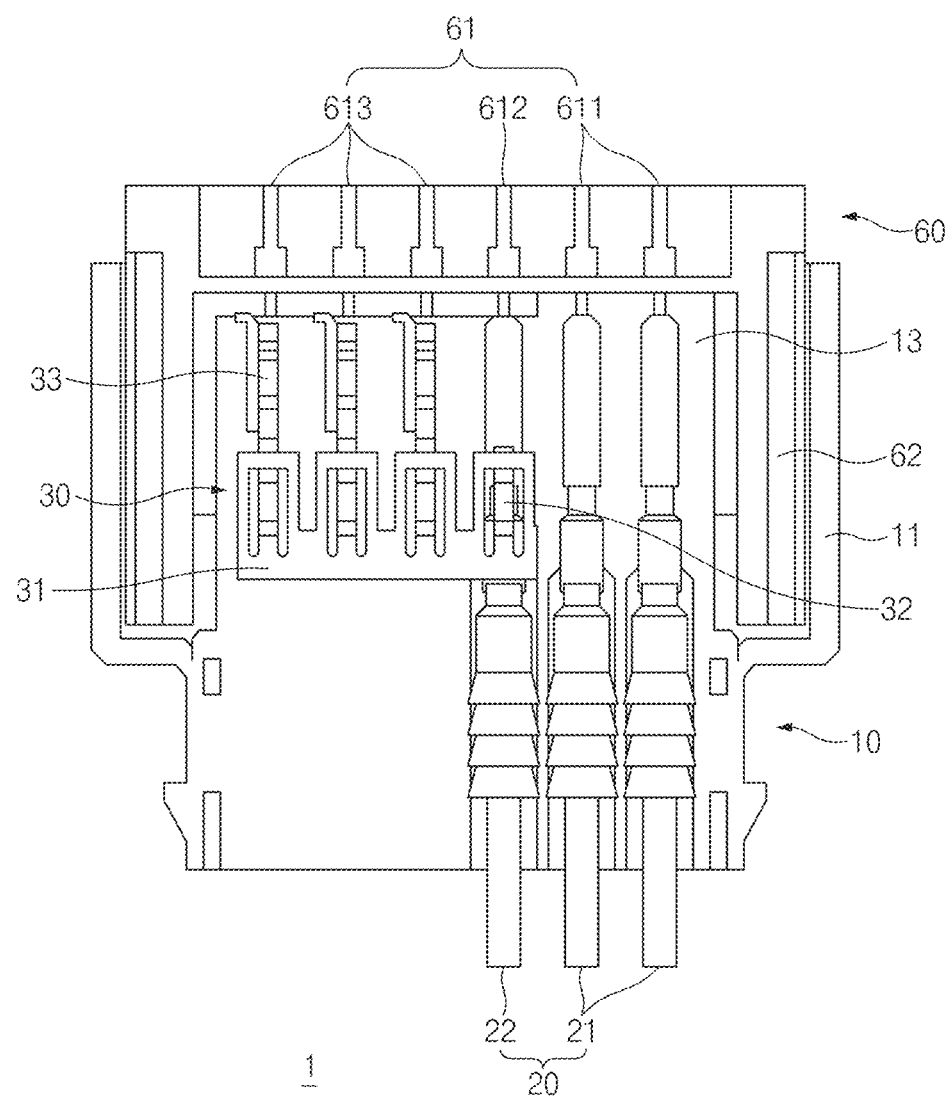
FIG. 5 is a cross-sectional view illustrating a structure in which a sensor unit is inserted into a connector according to an embodiment of the present disclosure.
Figure 6:
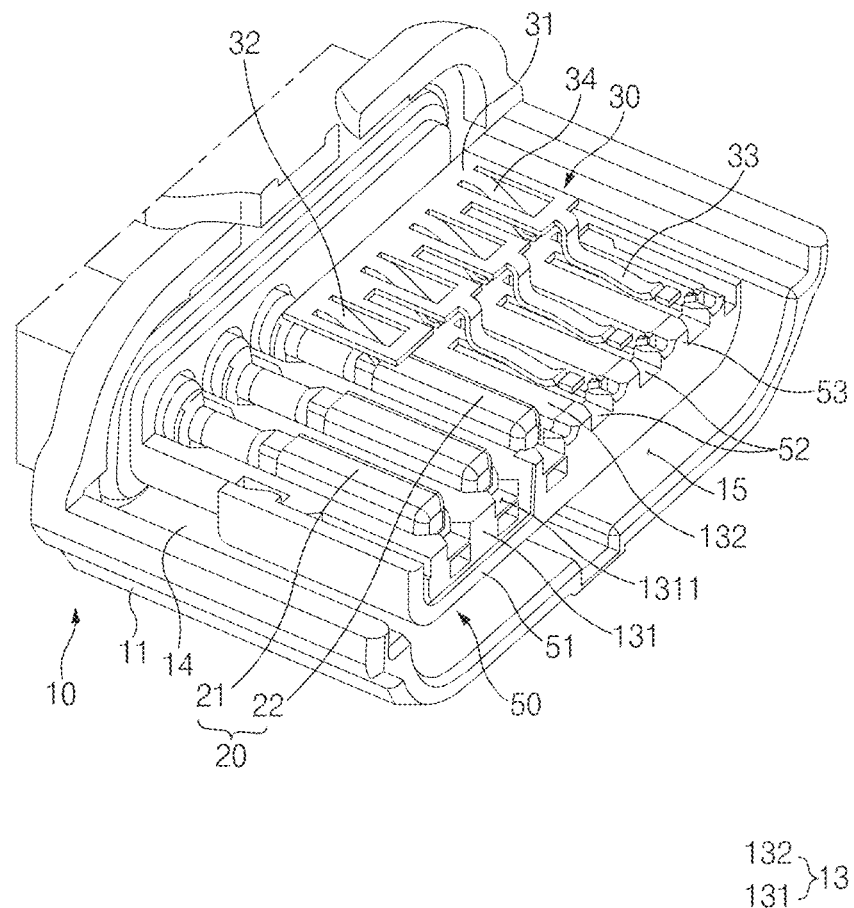
FIG. 6 is a view of a portion of a connector according to an embodiment of the present disclosure after removing a portion of a connector housing.

FIG. 2 is a perspective view of a connector 1 according to an embodiment of the present disclosure. FIG. 3 is an exploded perspective view of the connector 1 according to an embodiment of the present disclosure. FIG. 4 is a cross-sectional view illustrating the connector 1 in an exploded state according to an embodiment of the present disclosure. FIG. 5 is a cross-sectional view illustrating a structure in which a sensor unit 60 is inserted into the connector 1 according to an embodiment of the present disclosure. FIG. 6 is a view of a portion of the connector 1 according to an embodiment of the present disclosure after removing a portion of a connector housing 10.

The connector 1 according to an embodiment of the present disclosure may include a connection terminal 20, the connector housing 10, a joint terminal 30, a sealer 40, and an inner housing 50. The sealer 40 is a component configured and arranged to surround a signal terminal accommodation part 131 and a ground terminal accommodation part 132 of the connector housing 10, which are described below. In addition, the joint terminal 30 may be arranged and sandwiched between the terminal accommodation parts (signal terminal accommodation part 131 and ground terminal accommodation part 132) and the sealer 40 to fix their relative positions to each other. The sealer 40 may be formed in an annular shape so that other members are capable of passing through the sealer 40. The sealer 40 may be formed of an insulating material and may be formed of an elastic material Thus, a member in contact with the sealer 40 may maintain water-tightness.

A tab terminal 61 means a conductive terminal for an electrical external connection of the sensor unit 60. A plurality of tab terminals 61 may be used.

Connection Terminal 20

The connection terminal 20 may be a component configured to be electrically connected to the tab terminal 61 and to deliver an electrical signal or power. A plurality of connection terminals 20 may be used. The plurality of connection terminals 20 may be inserted into some of a plurality of insertion holes 12. Thus, the plurality of connection terminals 20 may be electrically connected to some of the plurality of tab terminals 61 of the sensor unit 60, respectively.

An end of each connection terminal 20 is inserted into the connector housing 10 through each insertion hole 12. A wire of each connection terminal 20 is extended to the outside of the connector housing 10 to head to a place where an electrical connection is needed. The end of each connection terminal 20 may be formed of a conductive material. The wire may be made of a conductive material surrounded by an insulating material.

In the connector 100 of FIG. 1, adjacent wires among the wires may be combined to each other and connected in parallel. However, the adjacent wires may not be combined in the connector 1 according to an embodiment of the present disclosure.

In addition, in the connector 100 of FIG. 1, the maximum number of connection terminals 102 may correspond to the number of the tab terminals of the sensor unit. However, the number of connection terminals 20 may be fixed in the connector 1 according to an embodiment of the present disclosure. As illustrated in FIG. 2, the number of connection terminals 20 may be fixed to three, but the number is not limited thereto.

The connection terminals 20 may include signal connection terminals 21 configured to be connected to the tab terminals 61 for transmitting the electrical signal or power. The connection terminals 20 may further include a ground connection terminal 22 configured to be connected to the tab terminal 61 provided for grounding. In an embodiment of the present disclosure, two signal connection terminals 21 and one ground connection terminal 22 are described. However, the number of the signal connection terminals 21 and the ground connection terminal 22 is not limited thereto.

Connector Housing 10

Figure 7:
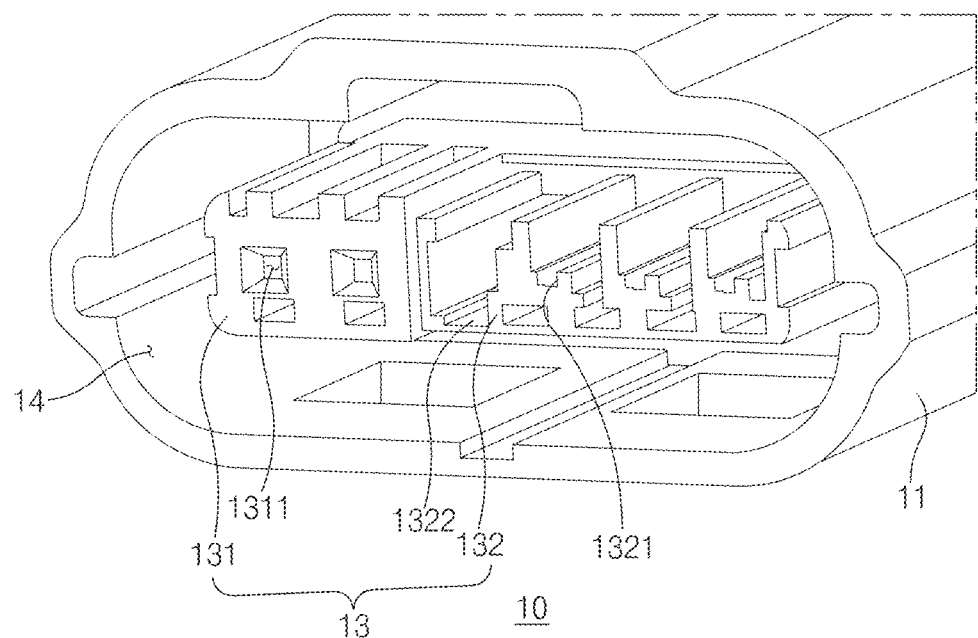
FIG. 7 is a view of an interior of a connector housing according to an embodiment of the present disclosure.

FIG. 7 is a view of the inside of the connector housing 10 according to an embodiment of the present disclosure.

The connector housing 10 forms an appearance of the connector 1. The connection terminals 20, the joint terminal 30, and the like may be fixed to the connector housing 10.

The connector housing 10 may include the plurality of insertion holes 12. The connection terminals 20 pass through the insertion holes 12. The number of insertion holes 12 may correspond to the number of connection terminals 20.

The connector housing 10 may include a housing exterior 11 and a housing interior 13 disposed inside the housing exterior 11. Furthermore, the housing interior 13 may include the signal terminal accommodation part 131 and the ground terminal accommodation part 132. Because the housing exterior 11 constitutes the appearance of the connector housing 10, the insertion holes 12 may be formed on a rear surface of the housing exterior 11. A front surface of the housing exterior 11 may be opened to form a housing opening 15, into which the sensor unit 60 may be inserted.

The signal terminal accommodation part 131 has a shape covering a side surface including an upper surface of each signal connection terminals 21 to accommodate the signal connection terminals 21. Therefore, a space inside the signal terminal accommodation part 131 communicates to the insertion holes 12. The signal connection terminals 21 are inserted into the signal terminal accommodation part 131 and the insertion holes 12. The signal terminal accommodation part 131 may be formed to protrude forward from the rear end of an inner side of the housing exterior 11. Open signal terminal openings 1311 may be formed at the front end of the signal terminal accommodation part 131. The open signal terminal openings 1311 are configured to allow the tab terminals 61 to pass through and be connected to the signal connection terminals 21, respectively.

The signal terminal accommodation part 131 may include spaces. The number of the spaces corresponds to the number of the signal connection terminals 21. The number of the signal terminal openings 1311 may correspond to the number of spaces of the signal terminal accommodation part 131. This structure allows each space of the signal terminal accommodation part 131 to communicate with the outside.

The ground terminal accommodation part 132 may accommodate the ground connection terminal 22. The ground terminal accommodation part 132 may have a plurality of ground terminal accommodation grooves, including one or more first and second ground terminal accommodation grooves 1321 and 1322, respectively. Each ground terminal accommodation groove has an open upper surface configured to allow grounding terminal parts of the joint terminal 30 to be disposed therein. The grounding terminal parts 33 and the ground connection terminal 22 may be respectively seated in the first and second ground terminal accommodation grooves 1321 and 1322. A shape of the second ground terminal accommodation groove 1322 may be formed differently from a shape of each first ground terminal accommodation groove 1321. The ground connection terminal 22 is seated in the second ground terminal accommodation groove 1322. Thus, the shape of the second ground terminal accommodation groove 1322 is suitable for seating the ground connection terminal 22. Each ground terminal part 33 is seated in each first ground terminal accommodation groove 1321.

The ground terminal accommodation part 132 may be formed to protrude forward from the rear end of the inner side of the housing exterior 11. The ground terminal accommodation part 132 may be disposed beside the signal terminal accommodation part 131. The number of the first and second ground terminal accommodation grooves 1321 and 1322 may respectively corresponds to the number of grounding terminal parts 33 and the ground connection terminal 22. In another embodiment, the number of the first and second ground terminal accommodation grooves 1321 and 1322 may be greater than or equal to the number of grounding terminal parts 33.

The housing exterior 11 may surround the housing interior 13. A portion of an inner surface of the housing exterior 11 may be formed to be spaced apart from the housing interior 13. Therefore, an insertion space 14, through which the sensor unit 60 is inserted, may be formed between the inner surface of the housing exterior 11 and an outer surface of the housing interior 13.

Inner Housing 50

Figure 8:
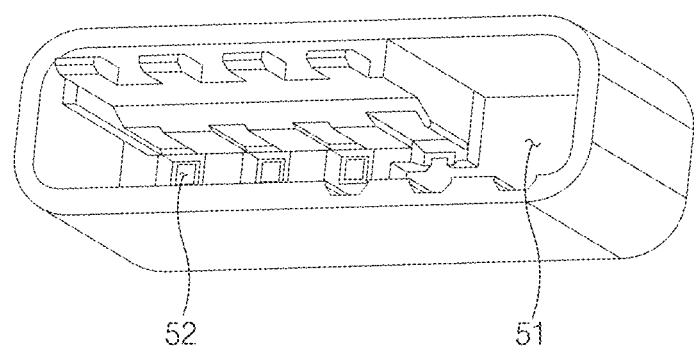
FIG. 8 is a view of an interior of an inner housing according to an embodiment of the present disclosure.
Figure 9:
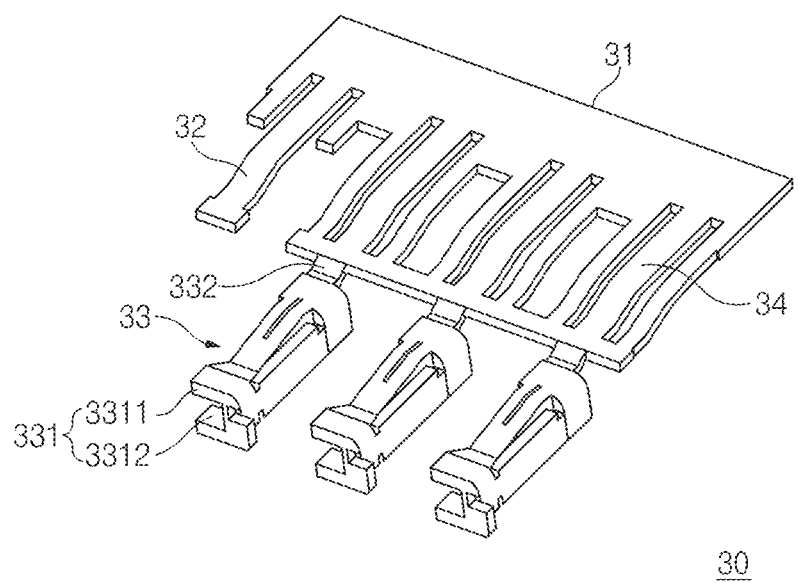
FIGS. 9-15 are perspective views of a joint terminal according to embodiments of the present disclosure.
Figure 10:
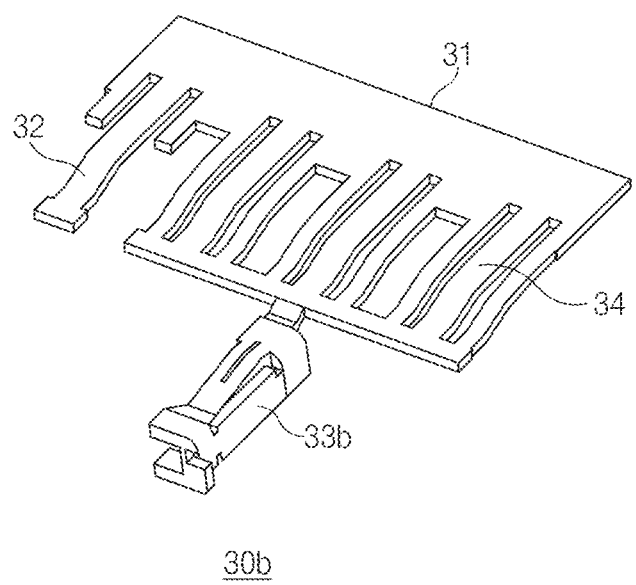
Figure 11:
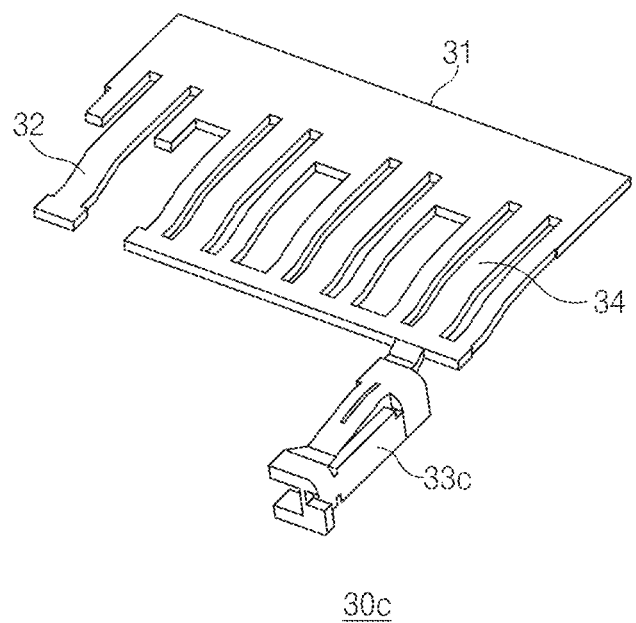
Figure 12:
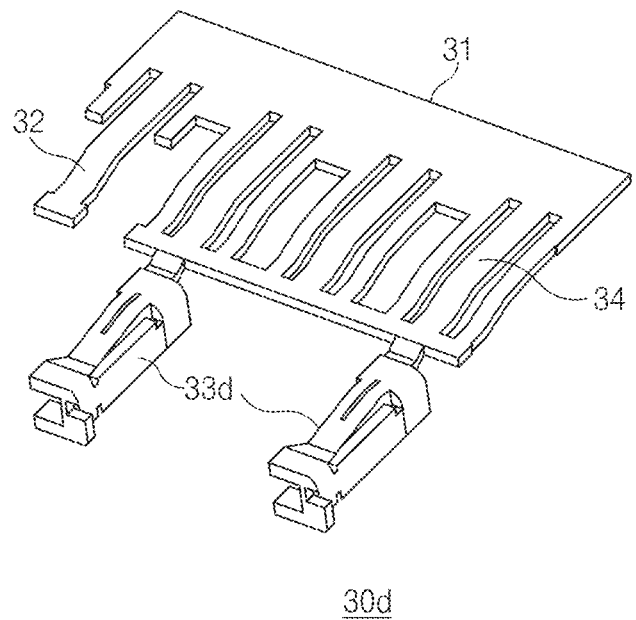
Figure 13:
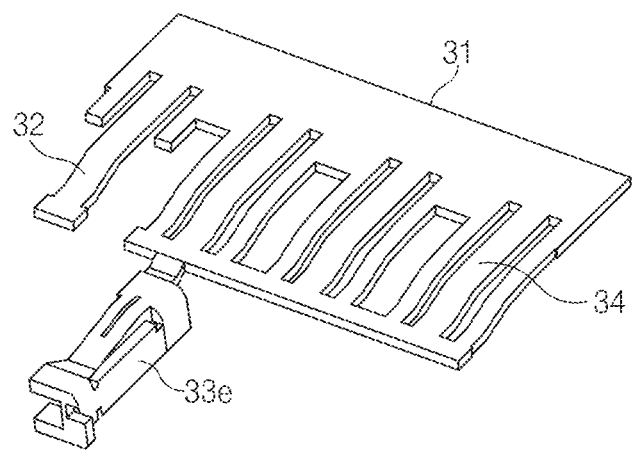
Figure 14:
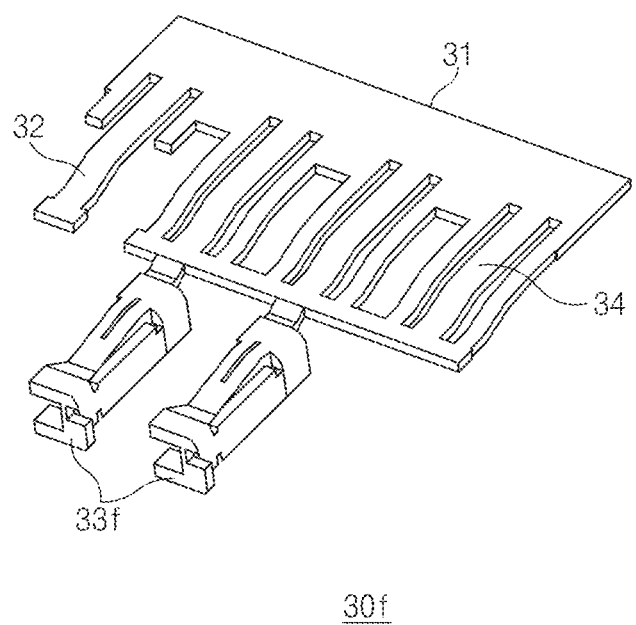
Figure 15:
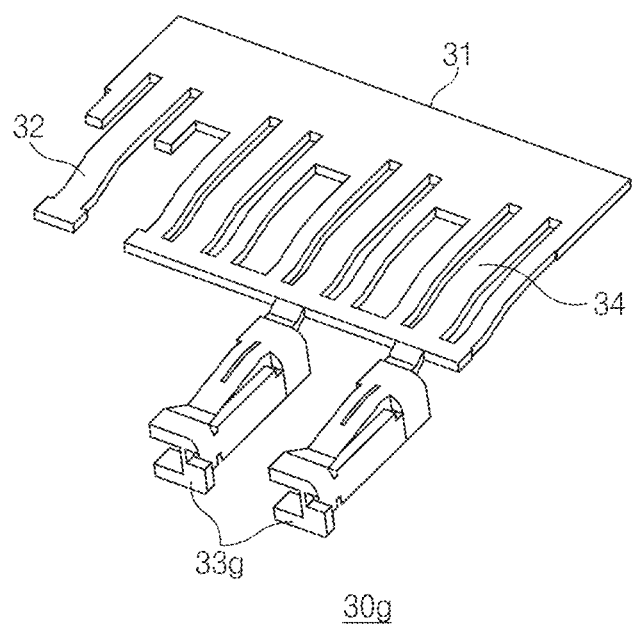

FIG. 8 is a view of an interior of the inner housing 50 according to an embodiment of the present disclosure.

The inner housing 50 may be a component configured to be inserted into the inside of the connector housing 10. The inner housing 50 may cover the signal terminal accommodation part 131 and the ground terminal accommodation part 132 inside the housing exterior 11. The inner housing 50 may include a signal accommodation part opening 51 and ground accommodation part openings 52. The signal accommodation part opening 51 is an opening through which the signal terminal accommodation part 131 passes. The ground accommodation part openings 52 are opened such that some of the tab terminals 61 are inserted in the ground terminal accommodation part 132.

The number of the ground accommodation part openings 52 may correspond to the number of the grounding terminal parts 33 and the ground connection terminal 22. Thus, each tab terminal 61 passing through each ground accommodation part opening 52 may be connected to components disposed in the first and second ground terminal accommodation grooves 1321 and 1322, respectively. Meanwhile, the signal accommodation part opening 51 may be largely open. Thus, the signal terminal accommodation part 131 may be exposed to the sensor unit 60 and the tab terminals 61 may pass through the signal accommodation part opening 51 to reach the signal terminal accommodation part 131.

Joint Terminal 30

FIGS. 9-15 are perspective views of the joint terminal 30 according to embodiments of the present disclosure.

The joint terminal 30 is a component for grounding the grounding tab terminals 613, i.e., some of or a second set of tab terminals among the tab terminals 61. The tab terminals 61 should be selectively grounded to indicate a position where the sensor unit 60 is disposed. Therefore, the joint terminal 30 may be made of a conductive material.

The joint terminal 30 may include a plate-shaped joint body 31, the grounding terminal parts 33 extending from the joint body 31 and electrically connected to the joint body 31, and a joint connection part 32.

The grounding terminal parts 33 may be at least one. The grounding terminal parts 33 may be accommodated in the connector housing 10. The grounding terminal parts 33 may be electrically connected to the grounding tab terminals 613 to be grounded among the plurality of tab terminals 61. In an embodiment of the present disclosure, the grounding terminal parts 33 have been described as having a maximum of three and at least one. The grounding terminal parts 33 are arranged differently in the three of the first and second grounding terminal accommodation grooves 1321 and 1322 in some cases. However, the number of the grounding terminal parts 33 is not limited thereto. The tab terminals 61 may be inserted into and electrically connected to the grounding terminal parts 33. The second set of tab terminals 61 connected to the grounding terminal parts 33 are the grounding tab terminals 613 to be grounded. Accordingly, the grounding tab terminals 613 are inserted into the first and second ground terminal accommodation grooves 1321 and 1322, in which the grounding terminal parts 33 are disposed. Thus, the grounding tab terminals 613 may be grounded. Furthermore, the grounding tab terminals 613 are inserted into the first and second ground terminal accommodation grooves 1321 and 1322, in which the grounding terminal parts 33 are not disposed. Thus, the grounding tab terminals 613 may not be grounded.

The grounding terminal parts 33 may include grounding contact parts 331 each having two legs 3311 and 3312 spaced apart from each other. Thus, the grounding tab terminals 613 may be inserted into the grounding terminal parts 33 and contacted with inner surfaces of the grounding terminal parts 33. The grounding contact parts 331 may be connected to the joint body 31 through grounding connection parts 332. The two legs 3311 and 3312 included in each grounding contact part 331 may be spaced apart from each other and have elasticity. Therefore, when each grounding tab terminal 613 is inserted between the two legs 3311 and 3312, the two legs 3311 and 3312 may be opened and contacted with an outer surface of each grounding tab terminal 613. After the grounding tab terminals 613 are removed, the two legs 3311 and 3312 may return to an original position.

The joint connection part 32 may be electrically connected to the ground connection terminal 22, which is one of the plurality of connection terminals 20. The joint connection part 32 may be contacted with and electrically connected to an end of the ground connection terminal 22 inserted into the connector housing 10. Therefore, the grounding tab terminals 613 to be grounded and the ground connection terminal 22 may be electrically connected to each other through the joint terminal 30. Thus, the corresponding tab terminals 613 may be grounded. Another grounding tab terminal 612 of the tab terminals 61 may be inserted into and electrically connected to the ground connection terminal 22. Thus, the grounding tab terminal 612 may be grounded.

As illustrated in FIGS. 9-15, the joint terminal 30 may have a variety of configuration of the grounding terminal parts 33 to perform encoding using the joint terminal 30 to distinguish a position where the sensor unit 60 is arranged. For example, the joint terminal 30 of FIG. 9 may have three grounding terminal parts 33. The joint terminal 30*b* of FIG. 10 may have one ground terminal part 33*b* at a position located in the middle of three positions. The joint terminal 30*c* of FIG. 11 may have one ground terminal part 33*c* at a position located at the outermost position among the three positions. The joint terminal 30*d* of FIG. 12 may have two grounding terminal parts 33*d* at positions located at the innermost and outermost positions among the three positions. The joint terminal 30*e* of FIG. 13 may have one ground terminal part 33*e* at a position located on the innermost position of the three positions. The joint terminal 30*f* of FIG. 14 may have two grounding terminal parts 33*f* at the middle position and the innermost position among the three positions. The joint terminal 30*g* of FIG. 15 may have two grounding terminal parts 33*g* at the middle position and the outermost position among the three positions. The joint terminals 30, 30*b*, 30*c*, 30*d*, 30*e*, and 30*f* may represent the connector 1 connected to the sensor unit 60 disposed at different positions, respectively.

The joint terminal 30 may further include a joint locking part 34. The joint locking part 34 may protrude from the joint body 31 and configured to be disposed on the ground terminal accommodation part 132. Thus, the joint locking part 34 may be partially coupled to an inner surface of the connector housing 10 forming the ground terminal accommodation part 132. The joint locking part 34 may have a form extending from an inner surface of an opening formed in the joint body 31. Furthermore, because the plurality of first and second ground terminal accommodation grooves 1321 and 1322 are provided, a plurality of joint locking parts 34 may also be formed.

The joint terminal 30 may be sandwiched and fixed between the sealer 40 and the outer surfaces of the signal terminal accommodation part 131 and the ground terminal accommodation part 132. After the joint terminal 30 is seated on the signal terminal accommodation part 131 and the ground terminal accommodation part 132, the sealer 40 may be assembled by pressing the upper surface of the joint terminal 30.

Hereinafter, a process in which the connector 1 and the sensor unit 60 are coupled and electrically connected to each other is described with reference to the drawings.

Figure 16:
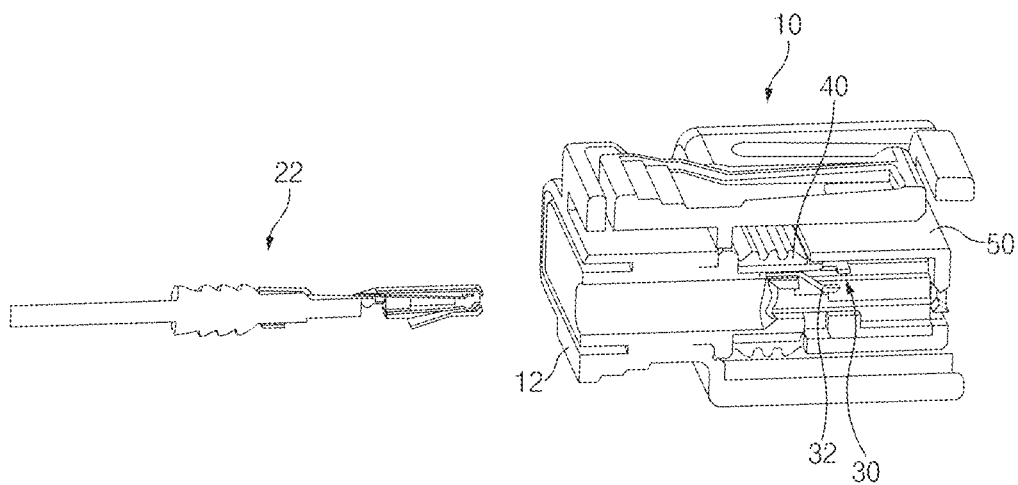
FIG. 16 is a view illustrating a situation in which a connection terminal is being inserted into a connector housing according to an embodiment of the present disclosure.

FIG. 16 is a view illustrating a situation in which the connection terminal 20 is being inserted into the connector housing 10 according to an embodiment of the present disclosure.

Referring to FIG. 16, the connection terminals 20 are to be inserted forward through the insertion holes 12 of the connector housing 10. The signal connection terminals 21 are to be inserted into the signal terminal accommodation part 131. The ground connection terminal 22 is inserted into the first and second ground terminal accommodation grooves 1321 and 1322 of the ground terminal accommodation part 132. The connection terminal 20 being inserted in FIG. 16 is the ground connection terminal 22.

Figure 17:
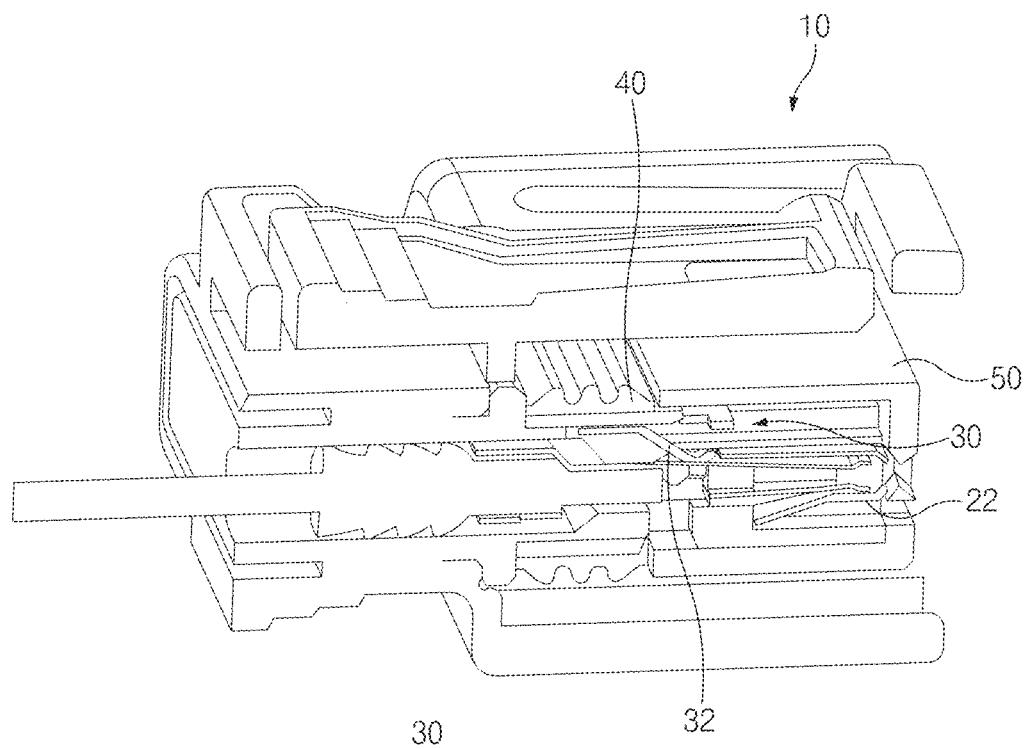
FIG. 17 is a view illustrating a state in which a ground connection terminal has been inserted into a connector housing and connected to a joint terminal according to an embodiment of the present disclosure.
Figure 18:
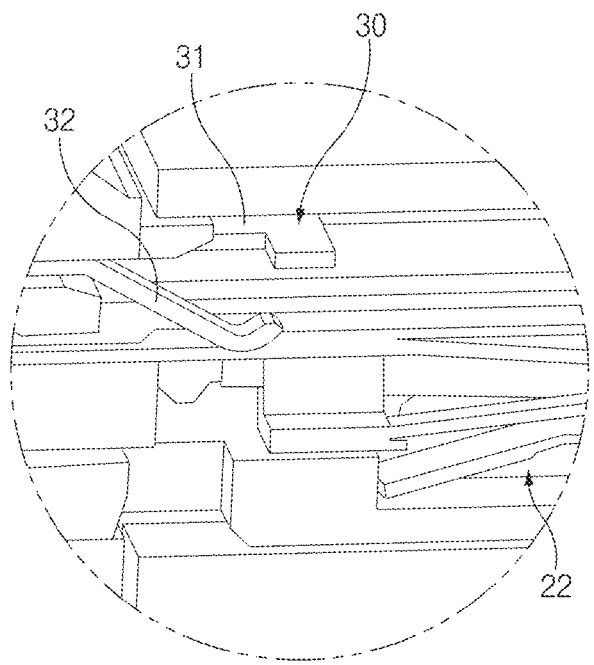
FIG. 18 is an enlarged view illustrating a position where a ground connection terminal and the joint connection part meet in FIG. 17.

FIG. 17 is a view illustrating a state in which the ground connection terminal 22 has been inserted into the connector housing 10 and connected to the joint terminal 30 according to an embodiment of the present disclosure. FIG. 18 is an enlarged view illustrating a position where the ground connection terminal 22 and the joint connection part 32 meet in FIG. 17.

When the ground connection terminal 22 has been inserted, the joint connection part 32 of the joint terminal 30 protrudes toward the first and second ground terminal accommodation grooves 1321 and 1322. The ground connection terminal 22 is inserted into the first and second ground terminal accommodation grooves 1321 and 1322. Thus, the joint connection part 32 of the joint terminal 30 may be in contact with and electrically connected to the outer surface of the ground connection terminal 22.

Figure 19:
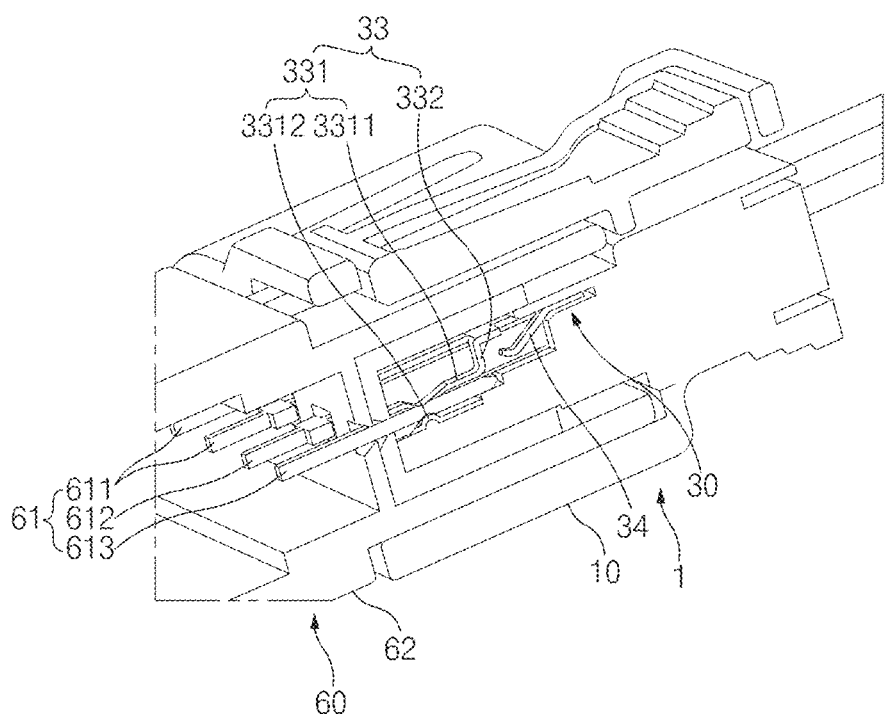
FIG. 19 is a view illustrating a situation in which a tab terminal of a sensor unit has been inserted into a joint connection part according to an embodiment of the present disclosure.

FIG. 19 is a view illustrating a situation in which the tab terminal 61 of the sensor unit 60 has been inserted into the joint connection part 32 according to an embodiment of the present disclosure.

Each tab terminal 61 of the sensor unit 60 is disposed in a form protruding from a sensor unit body 62. The sensor unit body 62 is inserted into the insertion space 14. The tab terminals 61 are inserted into and electrically connected to the connection terminal 20 or the grounding terminal parts 33. Some of the tab terminals 61, i.e. a first set or signal tab terminals 611, are connected to the signal connection terminals 21. Another of the tab terminals 61, i.e. the grounding connection tab terminal 612, is connected to the ground connection terminal 22 to be grounded. The others of the tab terminals 61, i.e. the second set or grounding tab terminals 613, are optionally connected to the grounding terminal parts 33.

Each of the grounding tab terminals 613 is inserted between the two legs 3311 and 3312 of the grounding contact parts 331. The grounding tab terminals 613 and the two legs 3311 and 3312 of the grounding contact parts 331 are in contact with and electrically connected to each other.

Figure 20:
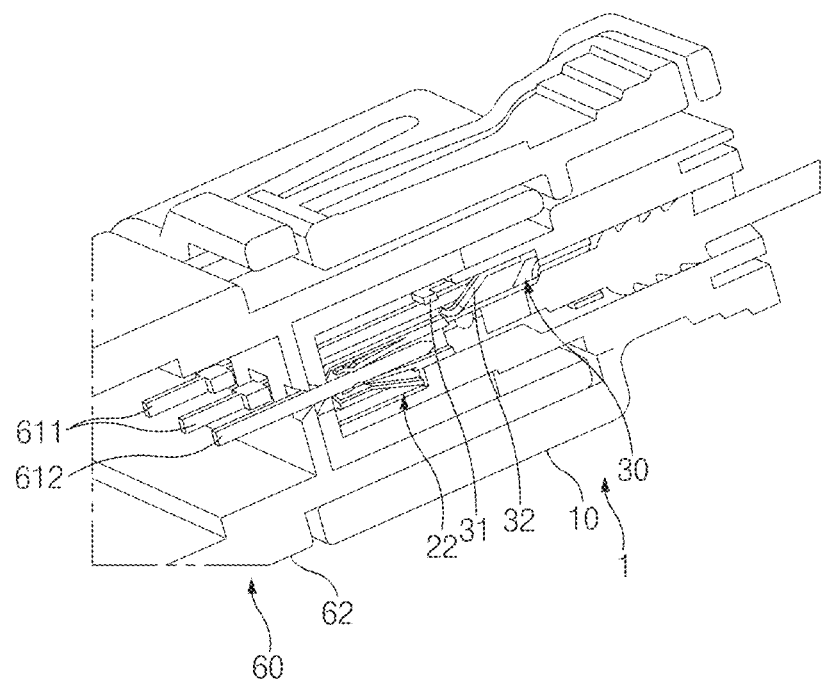
FIG. 20 is a view illustrating a situation in which a tab terminal of a sensor unit has been inserted into a connection terminal according to an embodiment of the present disclosure.

FIG. 20 is a view illustrating a situation in which the tab terminal 61 of the sensor unit 60 has been inserted into the connection terminal 20 according to an embodiment of the present disclosure.

The connection terminal 20 of FIG. 20 is the ground connection terminal 22 and the tab terminal 61 of FIG. 20 is the grounding connection tab terminal 612. Because the tab terminal 61 is inserted into the connection terminals 20 to make electrical connection, the inner surface of each connection terminal 20 may have a structure having two legs spaced apart from each other, such as the grounding contact parts 331.

The grounding connection tab terminal 612 may be inserted into the ground connection terminal 22 and thus be electrically connected to the ground. At the same time, the joint connection part 32 may be contacted with the grounding connection tab terminal 612 and the grounding tab terminals 613 connected to the joint terminal 30 may be grounded.

Because the connector 1 according to an embodiment of the present disclosure has the above-described configuration, the sensor unit 60 may be represented at each position by changing only the shape of the joint terminal 30 without a separate wire. The number of connection terminals 20 may be fixed to a specific number. Thus, the overall configuration may be simplified.

Accordingly, the connector having the simplified configuration is provided to simplify the manufacturing process and reduce the manufacturing cost while having the same function.

In the above description, all the components constituting the embodiments of the present disclosure are combined or operated in one. However, the present disclosure is not necessarily limited to these embodiments. In other words, within the scope of the present disclosure, all of the components may be selectively operated in combination with one or more. In addition, the terms "comprise", "constitute," or "have" described above mean that the corresponding component may be inherent unless otherwise stated. Thus, it should be construed not to exclude other components but to further include other components. All terms, including technical and scientific terms, have the same meaning as commonly understood by those having ordinary skill in the art unless otherwise defined. Terms commonly used, such as terms defined in a dictionary, should be interpreted to coincide with the contextual meaning of the related art. The terms shall not be interpreted in an ideal or excessively formal sense unless explicitly defined in the present disclosure.

The above description is merely illustrative of the technical idea of the present disclosure. Those having ordinary skill in the art to which the present disclosure belongs should be able to make various modifications and variations departing from the essential characteristics of the present disclosure. Therefore, the embodiments disclosed in the present disclosure are not intended to limit the technical idea of the present disclosure but to describe the present disclosure. The scope of the technical idea of the present disclosure is not limited by these embodiments. The protection scope of the present disclosure should be interpreted by the following claims. All technical ideas within the equivalent scope should be interpreted as being included in the scope of the present disclosure.

What is claimed is:

1. A connector comprising:
  a connector housing including a plurality of insertion holes;
  a plurality of connection terminals inserted into some of the plurality of insertion holes and configured to be electrically connected to a first set of a plurality of tab terminals of a sensor unit, wherein the sensor unit is configured to be connected to the connector; and
  a joint terminal accommodated inside the connector housing and the joint terminal including
    at least one grounding terminal part electrically configured to be connected to at least one of a second set of the plurality of tab terminals of the sensor unit, and
    a joint connection part electrically connected to a ground connection terminal, which is one of the plurality of connection terminals.

2. The connector of claim 1, wherein the plurality of connection terminals includes a signal connection terminal, and wherein the connector housing includes:
  a signal terminal accommodation part having a shape covering a side surface including an upper surface of the signal connection terminal and accommodate the signal connection terminal; and
  a ground terminal accommodation part including ground terminal accommodation grooves each having an open upper surface to dispose the at least one grounding terminal part.

3. The connector of claim 2, further comprising an inner housing inserted into the connector housing, the inner housing including
  a signal accommodation part opening through which the signal terminal accommodation part passes, and
  a ground accommodation part opening which is open to insert the second set of the plurality of tab terminals into the ground terminal accommodation part.

4. The connector of claim 2, wherein the number of the ground terminal accommodation grooves is greater than or equal to the number of the grounding terminal part.

5. The connector of claim 2, wherein the connector housing further includes a housing exterior surrounding the signal terminal accommodation part, and wherein a portion of an inner surface of the housing exterior is spaced apart from the signal terminal accommodation part and the ground terminal accommodation part to form an insertion space into which the sensor unit is inserted.

6. The connector of claim 2, further comprising a sealer configured and arranged to surround the signal terminal accommodation part and the ground terminal accommodation part, and
  wherein the joint terminal is sandwiched and fixed between the sealer and outer surfaces of the signal terminal accommodation part and the ground terminal accommodation part.

7. The connector of claim 1, wherein the joint terminal further includes a joint body electrically connected to the joint connection part and the at least one grounding terminal part,
  wherein the joint connection part protrudes from the joint body and is in contact with the ground connection terminal inserted into the connector housing.

8. The connector of claim 7, wherein the joint terminal further includes a joint locking part protruding from the joint body coupled to a portion of the connector housing.

9. The connector of claim 1, wherein the at least one grounding terminal part includes a grounding contact part having two legs spaced apart from each other to allow the second set of the plurality of tab terminals to be inserted into the grounding contact part and be in contact with an inner surface of the grounding contact part.

* * * * *